(12) United States Patent
Spielfogel

(10) Patent No.: US 8,866,964 B2
(45) Date of Patent: Oct. 21, 2014

(54) ASSEMBLIES AND METHODS FOR REDUCING THE COMPLEXITY OF CAMERA MOUNTING ASSEMBLIES

(75) Inventor: Jason Spielfogel, Aliso Viejo, CA (US)

(73) Assignee: Verint Systems Inc., Santa Clara, CA (US)

( * ) Notice: Subject to any disclaimer, the term of this patent is extended or adjusted under 35 U.S.C. 154(b) by 126 days.

(21) Appl. No.: 13/606,322

(22) Filed: Sep. 7, 2012

(65) Prior Publication Data

US 2013/0063654 A1   Mar. 14, 2013

Related U.S. Application Data

(60) Provisional application No. 61/532,925, filed on Sep. 9, 2011.

(51) Int. Cl.
*H04N 5/225* (2006.01)
*G08B 13/196* (2006.01)

(52) U.S. Cl.
CPC .......... *H04N 5/225* (2013.01); *G08B 13/19632* (2013.01); *G08B 13/1963* (2013.01)
USPC ............................. 348/373; 348/143; 396/427

(58) Field of Classification Search
CPC ............... H04N 5/2252; H04N 5/2251; G08B 13/19619; G08B 13/1963; G08B 13/19632; F21V 21/04; F16B 13/0808
See application file for complete search history.

(56) References Cited

U.S. PATENT DOCUMENTS

| | | | | |
|---|---|---|---|---|
| 5,410,782 | A | * | 5/1995 | Holyoake ........................ 24/505 |
| 5,649,255 | A | * | 7/1997 | Schieltz ........................ 396/427 |
| 6,525,766 | B1 | * | 2/2003 | Ikoma et al. .................. 348/151 |
| D544,979 | S | * | 6/2007 | Hartmann et al. ............. D26/74 |
| D601,293 | S | * | 9/2009 | MacKenzie .................... D26/74 |
| D640,819 | S | * | 6/2011 | Pan ................................ D26/74 |
| D698,069 | S | * | 1/2014 | Messisaen .................... D26/74 |
| D698,070 | S | * | 1/2014 | Messisaen .................... D26/74 |
| 2006/0087850 | A1 | * | 4/2006 | Thompson et al. ........... 362/362 |
| 2009/0091941 | A1 | * | 4/2009 | Svensson ...................... 362/404 |
| 2009/0147517 | A1 | * | 6/2009 | Li et al. .................... 362/249.02 |
| 2010/0039829 | A1 | * | 2/2010 | Tsai .............................. 362/373 |

* cited by examiner

*Primary Examiner* — Dennis Hogue
(74) *Attorney, Agent, or Firm* — Meunier Carlin & Curfman

(57) ABSTRACT

A camera mounting assembly includes a positioning support defining a central axis and a plurality of brackets. Each of the brackets includes a first end coupled to the positioning support and a second end spaced apart from the first end. The brackets are configured to move between a retracted state and an extended state. When in the retracted state, the second ends of the brackets are at a first distance from the central axis, and in the extended state, the second ends of the brackets are at a second distance. The second distance is greater than the first distance.

11 Claims, 5 Drawing Sheets

ASSEMBLIES AND METHODS FOR REDUCING THE COMPLEXITY OF CAMERA MOUNTING ASSEMBLIES

RELATED APPLICATIONS

This application hereby claims the benefit of and priority to U.S. Provisional Patent Application 61/532,925, titled "CAMERA MOUNTING ASSEMBLY", filed Sep. 9, 2011, and which is hereby incorporated by reference in its entirety.

TECHNICAL BACKGROUND

Surveillance cameras allow users to view and capture video of a scene. Often, this video data allows security personnel or other users to monitor several areas at the same time for any number of reasons.

Surveillance cameras mounted in overhead locations may further allow users to monitor areas that may be otherwise difficult to view. However, installing surveillance cameras at overhead locations may be difficult and time consuming. For instance, many popular cameras require complex attachments to retain the camera in the ceiling within which it is mounted. Those assemblies that are considered simple to install are commonly unreliable. Moreover, the disassembly or removal of prior camera designs can be just as complex as their installation.

OVERVIEW

Assemblies and methods are provided herein that reduce the complexity of mounting camera assemblies to a support, such as a ceiling, and improve the ease with which camera assemblies can be removed from the support. Brackets are employed that move between a retracted state and an extended state so as to secure the camera assembly to the support.

In an embodiment, a camera mounting assembly includes a positioning support defining a central axis and a plurality of brackets coupled to the positioning support. Each of the brackets includes a first end coupled to positioning support and a second end spaced apart from the first end. The brackets are configured to move between a retracted state and an extended state. In the retracted state the second ends of the brackets are at a first distance from the central axis, and in the extended state the second ends of the brackets are at a second distance from the central axis. The second distance is greater than the first distance.

In another embodiment, a camera assembly comprises a camera mounting assembly including a positioning support defining a central axis, the positioning support having an upper portion and a lower portion having at least one flange extending away from the central axis. The camera assembly further comprises a plurality of brackets coupled to the upper portion, each of the brackets include a first end coupled to the upper portion of the positioning support, and a second end spaced apart from the first end, wherein the brackets are configured to move between a retracted state and an extended state, which in the retracted state the second ends of the brackets are at a first distance from the central axis and in the extended state the second ends of the brackets are at a second distance, the second distance being greater than the first distance. The camera assembly also includes a camera coupled to the mounting assembly.

In another embodiment, a method of mounting a camera assembly to a support comprises positioning a camera assembly adjacent an opening in a support, the camera assembly including a positioning support defining a central axis and a plurality of brackets, each of the brackets including a first end coupled to the positioning support, and a second end spaced apart from the first end, moving the brackets to a retracted state, passing the brackets through the opening in the support, and moving the brackets to an extended state, wherein in the retracted state the second ends of the brackets are at a first distance from the central axis and in the extended state the second ends of the brackets are at a second distance, the second distance being greater than the first distance.

In an embodiment, a plane is defined by the brackets and a line perpendicular to the central axis and wherein the second ends of the brackets are on a first side of the plane when the brackets are in the retracted state and are on a second side of the plane when the brackets are in the extended state, the second side of the plane being opposite the first side of the plane.

In an embodiment, the brackets are configured to rotate between the retracted state and the extended state.

In an embodiment, a camera assembly includes biasing members coupled to the brackets, the biasing members being configured to exert biasing forces on the brackets to move the brackets toward the extended state.

In an embodiment, a camera assembly includes a retention member coupled to the positioning support, the retention member being configured to receive a camera therein.

In an embodiment, the retention member includes a retention flange and the camera includes a camera housing having an engagement flange, wherein the retention flange is configured to engage the engagement flange to couple the camera to the retention member.

In an embodiment, the brackets are in the retracted state, at least one of the brackets is oriented at an acute angle relative to a reference line passing through the bracket and being parallel to the central axis, and when the bracket is in the in the extended state, the bracket is at an obtuse angle relative to the reference line.

In an embodiment, the camera assembly further comprises a cover, the cover being configured to magnetically couple to the camera assembly.

DETAILED DESCRIPTION

Assemblies and methods are provided herein for mounting a camera assembly to a support, such as a ceiling. In at least one example, brackets may be spring-loaded to readily move between a retracted state and an extended state. In one such example, the brackets may be rotated between the retracted state and the extended state. When the brackets are in the retracted state, the camera assembly is able to pass through an opening in a support. Once positioned relative to the support, as the brackets rotate toward the extended state, the brackets move into engagement with the support. Continued rotation of the brackets moves the camera into position thereby mounting the camera to the support. Such a configuration may allow for ready mounting of cameras in overhead locations while minimizing the use of tools.

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1A:
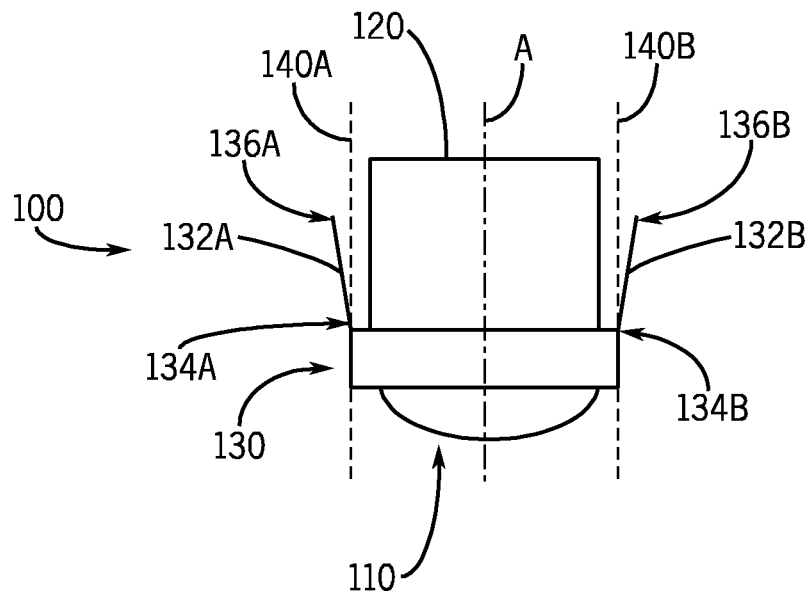
FIG. 1A illustrates a schematic diagram of a camera assembly having brackets in a retracted state according to one example.
Figure 1B:
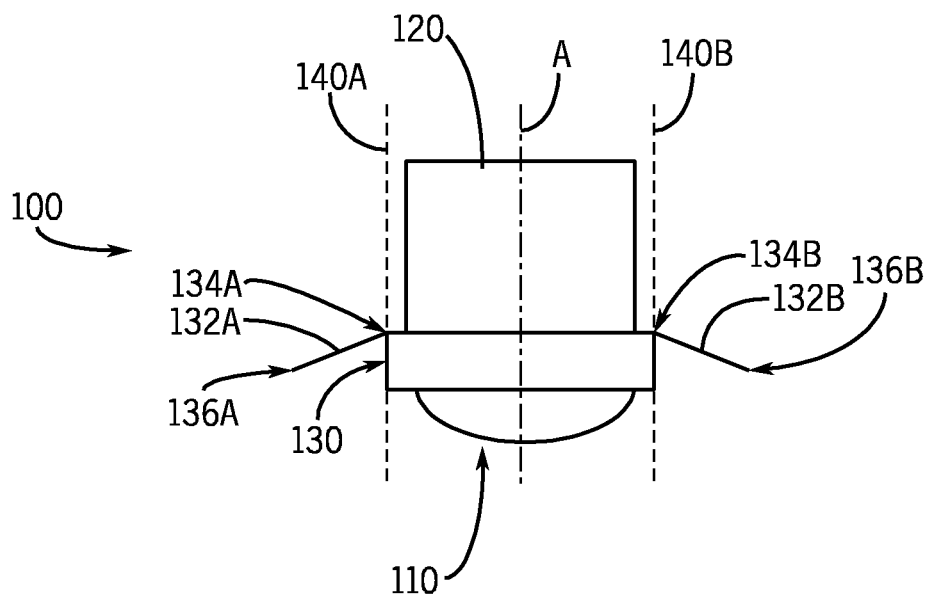
FIG. 1B illustrates a schematic diagram of the camera assembly of FIG. 1A in which the brackets are in an extended state.

FIGS. 1A and 1B illustrate a camera assembly 100. As illustrated in FIGS. 1A and 1B, the camera assembly 100 generally includes a video camera 110 that is supported by a camera housing 120. The camera assembly 100 also includes a positioning support 130. In the illustrated example, the video camera 110 is configured to be readily mounted in an overhead position, such as in a ceiling or other overhead location, to capture video data of a selected location.

In many situations, the camera assembly 100 may be mounted in an overhead location via an opening defined in a substrate at an overhead mounting location. For example, the camera assembly 100 may be mounted in a ceiling via an opening cut in a ceiling panel. For various reasons it may be desirable to have the opening as small as possible while still allowing desired portions of the camera assembly 100 to be positioned in the ceiling to effectuate a partially recessed mounting configuration.

The camera assembly 100 includes brackets 132A, 132B coupled to or integrated with the positioning support 130. The brackets 132A, 132B are configured to move from a retracted state shown in FIG. 1A to an extended state shown in FIG. 1B. While in the retracted state, ends of the brackets 132A-132B are closer to a central axis A of the camera assembly 100 than when the brackets 132A-132B are in the extended state. Referring to FIG. 1A, such a configuration may allow the camera assembly 100 to have a sufficiently small cross-sectional area, as taken perpendicular to the central axis A, to allow the camera assembly 100 to pass through an opening in a selected mounting location.

As shown in FIG. 1A-1B, the mounting brackets 132A-132B may be configured to pivot. In such an example, the mounting brackets 132A-132B are oriented at an acute angle relative to reference lines 140A-140B, which are parallel to the central axis A of the camera assembly 100 and pass through points about which the brackets 132A-132B pivot.

Once the brackets 132A, 132B are passed through an opening at a selected mounting location, the brackets 132A, 132B may be moved to the extended state shown in FIG. 1B. When in the extended state, the brackets 132A, 132B may be oriented at an obtuse angle relative to the reference lines 140A, 140B. Further, in some examples the angular rotation of the brackets 132A, 132B as the brackets 132A, 132B move from the retracted state to the extended state may be greater than 90 degrees.

In another example, the brackets 132A-132B may be described as including first ends 134A-134B and second ends 136A-136B. The brackets 132A-132B may pivot about the first ends 134A-134B as the brackets 132A-132B move between the extended and retracted state shown in FIGS. 1A and 1B. In such an example, the first ends 134A-134B are coplanar with a plane defined by a line that is perpendicular to the central axis A and includes the first ends 134A-134B.

As illustrated in FIGS. 1A, in the retracted state the second ends 136A-136B of the brackets 132A-132B are on a first side of the plane introduced above. As the brackets 132A-132B move toward the extended state shown in FIG. 1B, the second ends 136A-136B move to a second, opposing side of the plane.

The brackets 132A-132B may be moved between the retracted states and the extended states described above in any suitable manner. In at least one example, the brackets 132A-132B may be rotated between the retracted state and extended state. It will be appreciated that any suitable mechanism or movement will be used to move the brackets 132A-132B between the retracted and extended states. Such mechanisms may include biasing members, which include, without limitation, compliant and/or flexible members, springs (including torsional springs), other mechanisms, and combinations thereof. One exemplary configuration will be described in more detail with reference to FIG. 2.

Figure 2:
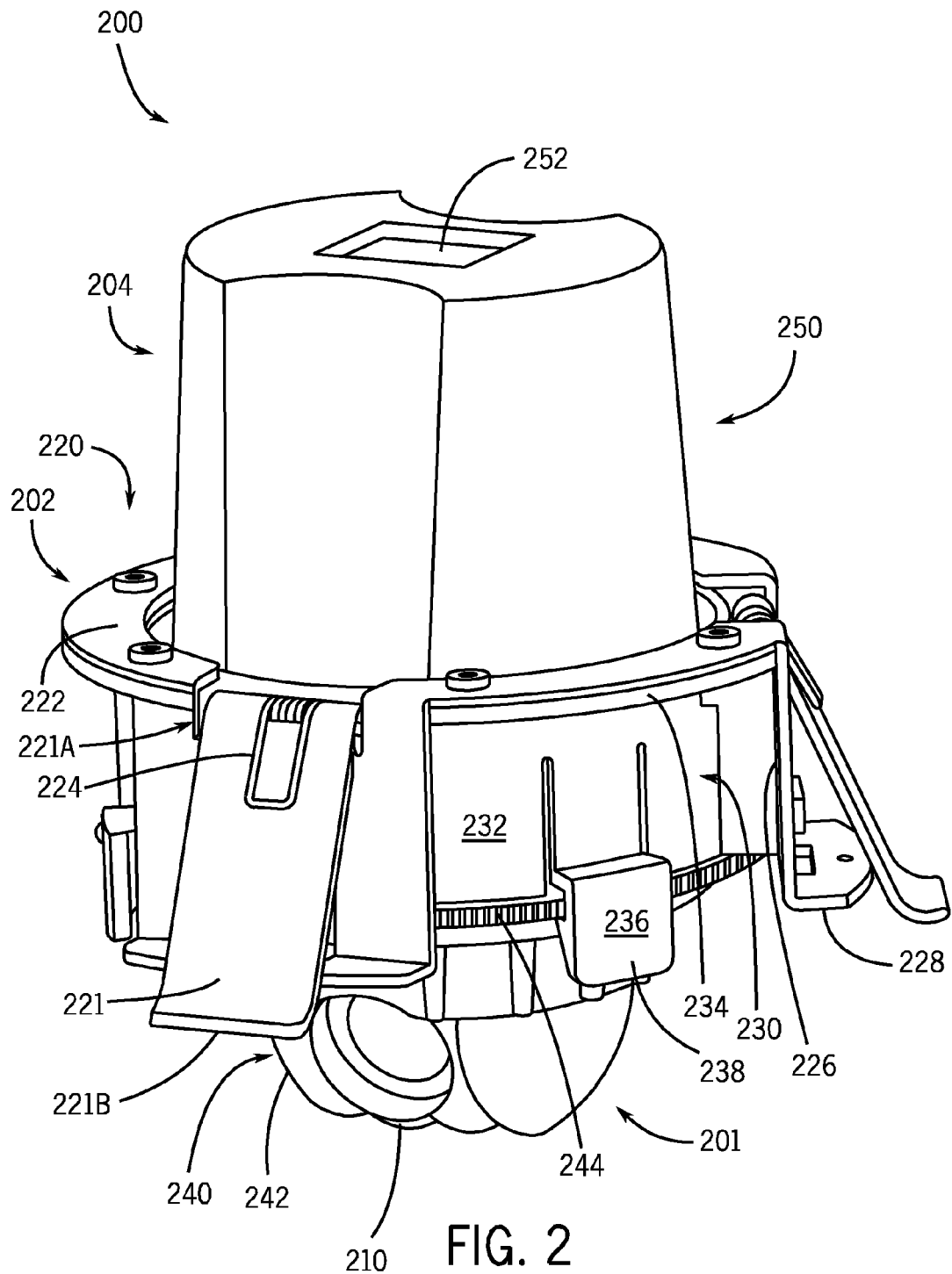
FIG. 2 illustrates a perspective view of an assembled camera assembly according to one example.

FIG. 2 illustrates a camera assembly 200 that generally includes a camera 201, an outer mounting assembly 202, and a camera housing assembly 204. The outer mounting assembly 202 is configured to allow the camera assembly 200 to be mounted in an overhead location, such as in a ceiling. The configuration and assembly of the camera assembly will first be introduced followed by a discussion of the mounting of the camera assembly 200 at a selected location.

The camera 201 includes a lens 210 configured to cooperate with components (not shown) contained within the camera housing assembly 204 to capture video of the scene. The camera housing assembly 204 is supported by the outer mounting assembly 202.

In at least one example, the outer mounting assembly 202 includes a positioning support 220 and a camera retention member 230. The positioning support 220 couples to a plurality of brackets 221. The brackets 221 are configured to move between a retracted state and a deployed state to clip the camera assembly 200 to the mounting location.

In the illustrated example, the brackets 221 rotatingly couple to the positioning support 220 at an upper flange 222. In particular, each of the brackets 221 may include a first end 221A rotatingly coupled to the upper flange 222. Further, the brackets 221 are configured to rotate to thereby move second ends 221B of the brackets 221 between retracted states and extended states in a similar manner as described above with reference to FIGS. 1A and 1B. In at least one example, biasing members 224 are configured to exert a biasing force on the brackets 221 to move the brackets 221 toward the extended states. In at least one example, the biasing members 224 are torsional springs, though it will be appreciated that other types of biasing members may be used.

The positioning support 220 may further include struts 226. The struts 226 extend away from the upper flange 222. Lower flanges 228 are spaced apart from the upper flange 222 and extend away from the struts 226. Such a configuration thus spaces the lower flanges 228 from the upper flange 222 and thus the lower flanges 228 from the first ends 221A of the brackets 221.

In the illustrated example, a camera retention member 230 couples the positioning support 220 to the camera housing assembly 204. In particular, the camera retention member 230 may include an annular body 232 that is configured to receive the camera housing assembly 204.

The camera retention member 230 further includes an upper flange 234 extending outwardly from the body 232. The upper flange 234 of the camera retention member 230 couples to the upper flange 222 of the positioning support 220. The retention member 230 also includes struts 236 extending from the body 232 opposite the upper flange 234. Lower retention flanges 238 extend from the struts 236 and are configured to engage the camera housing assembly 204.

In particular, the camera housing assembly 204 includes a lower member 240 and upper member 250. The lower member 240 includes a lens housing 242 configured to support and house the lens 210. The lower member 240 also includes an engagement flange 244 configured to engage the lower retention flanges 238. The upper member 250 is coupled to the lower member 240. Further, the upper member 250 is configured to house components associated with capturing, transmitting, and/or storing video data.

In at least one example, the upper member 250 houses a cable plug 252 that is configured to have a cable connector and cable coupled thereto. Such a configuration may allow the camera assembly 200 to be readily coupled to a network to allow the camera assembly 200 to transmit video data captured by the camera assembly 200. Coupling a cable to the cable plug 252 may be a step in an exemplary process for mounting the camera assembly 200 to an overhead location, which will now be discussed in more detail.

Figure 3A:
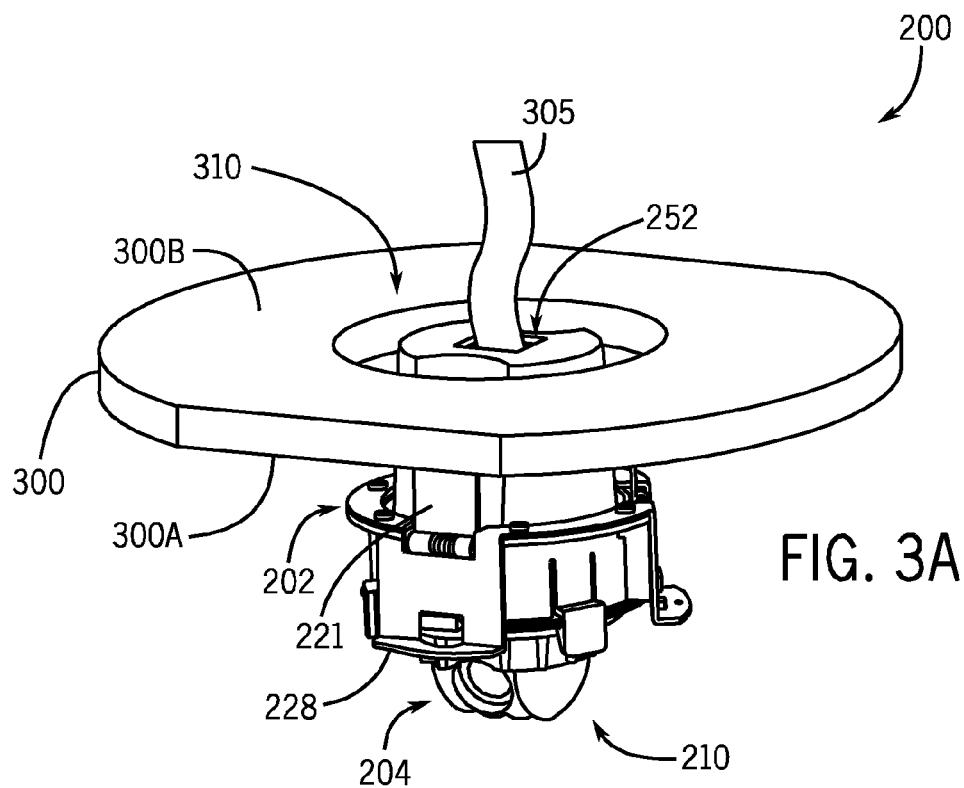
FIG. 3A illustrates various steps for mounting a camera assembly to a support according to one example.

FIG. 3A illustrates various steps for mounting the camera assembly 200 to a support 300 in which a substantial portion of the camera assembly 200 is recessed relative to the support 300. For ease of reference, an overhead support will be described. It will be appreciated that the camera assembly 200 may be mounted to a support at any orientation or position as desired.

A preliminary step for mounting the camera assembly 200 includes coupling the camera housing assembly 204 to the outer mounting assembly 202 as described above. An additional preliminary step may also include coupling a cable 305 to the cable plug 252. FIG. 3A further illustrates that mounting the camera assembly 200 to the support 300 includes cutting a hole 310 in the support 300. The support 300 has a first surface 300A and a second surface 300B opposite the first surface 300A.

After the hole 310 is cut, the brackets 221 may then be moved to a retracted state as shown in FIG. 3A. With the brackets 221 in the retracted state, the camera assembly 200 is positioned relative to the support 300 such that the support 300 is between the lower flange 228 and the second ends 221B (FIG. 2) of the brackets 221.

Figure 3B:
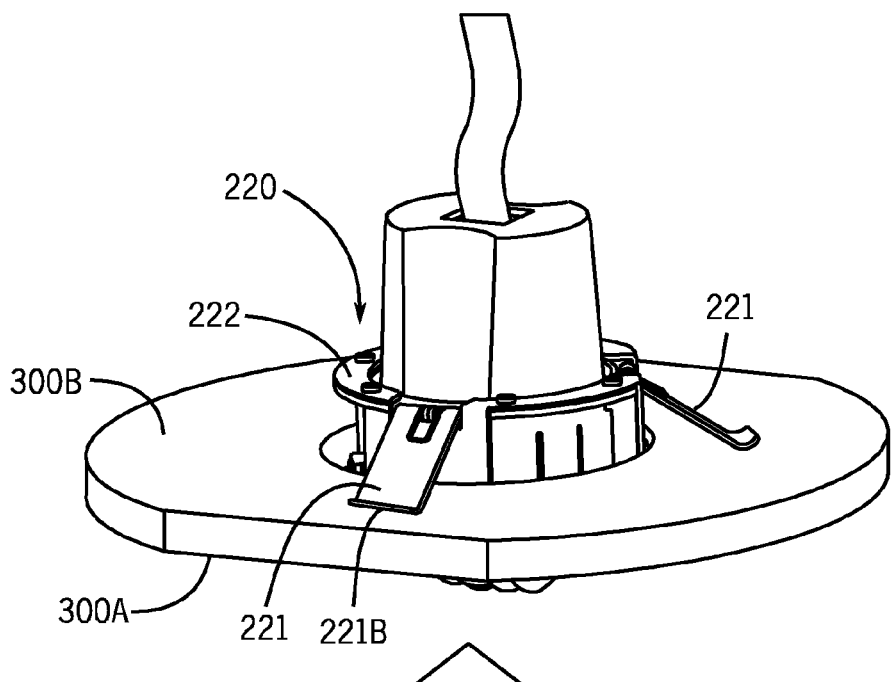
FIG. 3B illustrates various steps for mounting a camera assembly to a support according to one example.

As illustrated in FIG. 3B, with the camera assembly 200 thus positioned, the brackets 221 may be released and allowed to move toward the extended state. As introduced above, the brackets 221 may be configured to rotate as they move from the retracted state toward the extended state. As the brackets 221 rotate, the second ends 221B contact the second surface 300B and thereby exert a force on the camera assembly 200 in the direction of arrow 320.

Continued rotation of the seconds ends 221B of the brackets 221 causes the brackets 221 to move the upper flange 222 of the positioning support 220 through the hole 310 (FIG. 3A) and past the second surface 300B. In at least one example, the biasing members 224 exert sufficient force to cause the camera assembly 200 to move in the direction of arrow 320 until the lower flanges 228 (FIG. 2) contact the first surface 300B of the support 300, thereby clipping the support between the brackets 221 and the lower flanges 228. Thereafter, the lens 210 (FIG. 3A) may be rotated to the desired position to capture video data from a selected location.

Figure 3C:
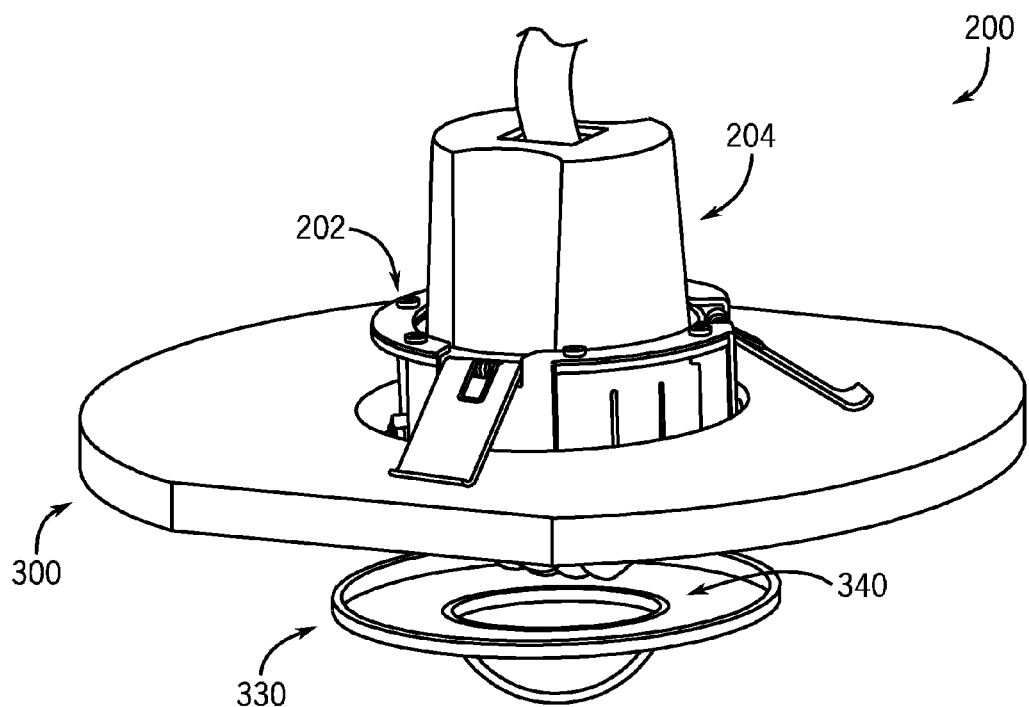
FIG. 3C illustrates various steps for mounting a camera assembly to a support according to one example.

As illustrated in FIG. 3C, the process for mounting the camera assembly 200 to the support 300 may include coupling a cover 330 to the camera housing assembly 204. In at least one example, the cover 330 may be magnetically coupled to the lower member 240 (FIG. 2) of the camera housing assembly 204 and/or the outer mounting assembly 202 to thereby secure the cover in place with the camera assembly 200.

In at least one example, the cover 330 may include additional mounting features for further securing the cover 330 to the camera assembly 200. In the illustrated example, the cover 330 includes one or more channel 340 defined on an interior portion thereof that is configured to engage the lower flanges 228 of the positioning support 220 (both seen in FIG. 2). In such an example, the engagement may provide a registered position for the channel 340. In particular, the cover 330 may be rotated relative to the positioning support 220 until one of the lower flanges 228 (FIG. 2) engages the corresponding channels 340. This engagement may then index the cover 330 in position relative to the lower flanges (FIG. 2).

Figure 3D:
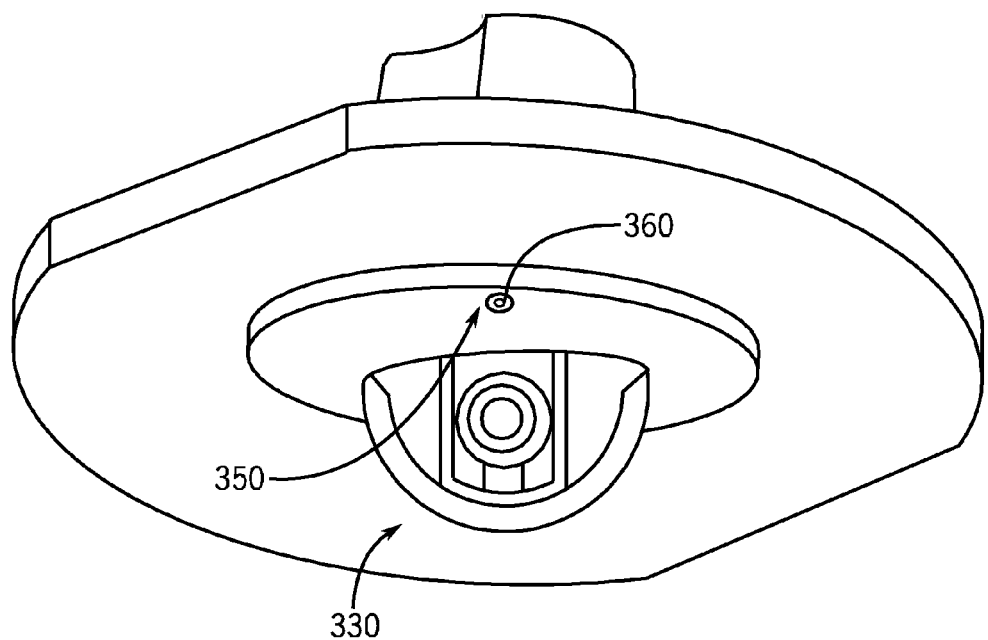
FIG. 3D illustrates various steps for mounting a camera assembly to a support according to one example.

As shown in FIGS. 3C-3D, fastener holes 350 may be defined through the cover 330 and at the locations of the channels 340. Since the location of the channels 340 is aligned with the lower flanges 228 (FIG. 2) and the fastener holes are known relative to the channels 340, the fastener holes are thus aligned relative to the lower flanges 228. With the fastener holes aligned to the lower flanges 228 (FIG. 2), one or more fasteners 360 may then be used to secure the cover 330 to the lower flanges 228.

Accordingly, as shown in FIGS. 3A-3C the movement of the brackets 221 from a retracted state to an extended state allows the camera assembly 200 to be readily mounted to the support 300 in which a substantial portion of the camera assembly 200 is recessed relative to the support 300. Further, the mounting of the camera assembly 200 may be performed with minimum tools thereby facilitating rapid and convenient installation. At some point after installation, it may be desirable to remove the camera 201 (best seen in FIG. 2).

Figure 4:
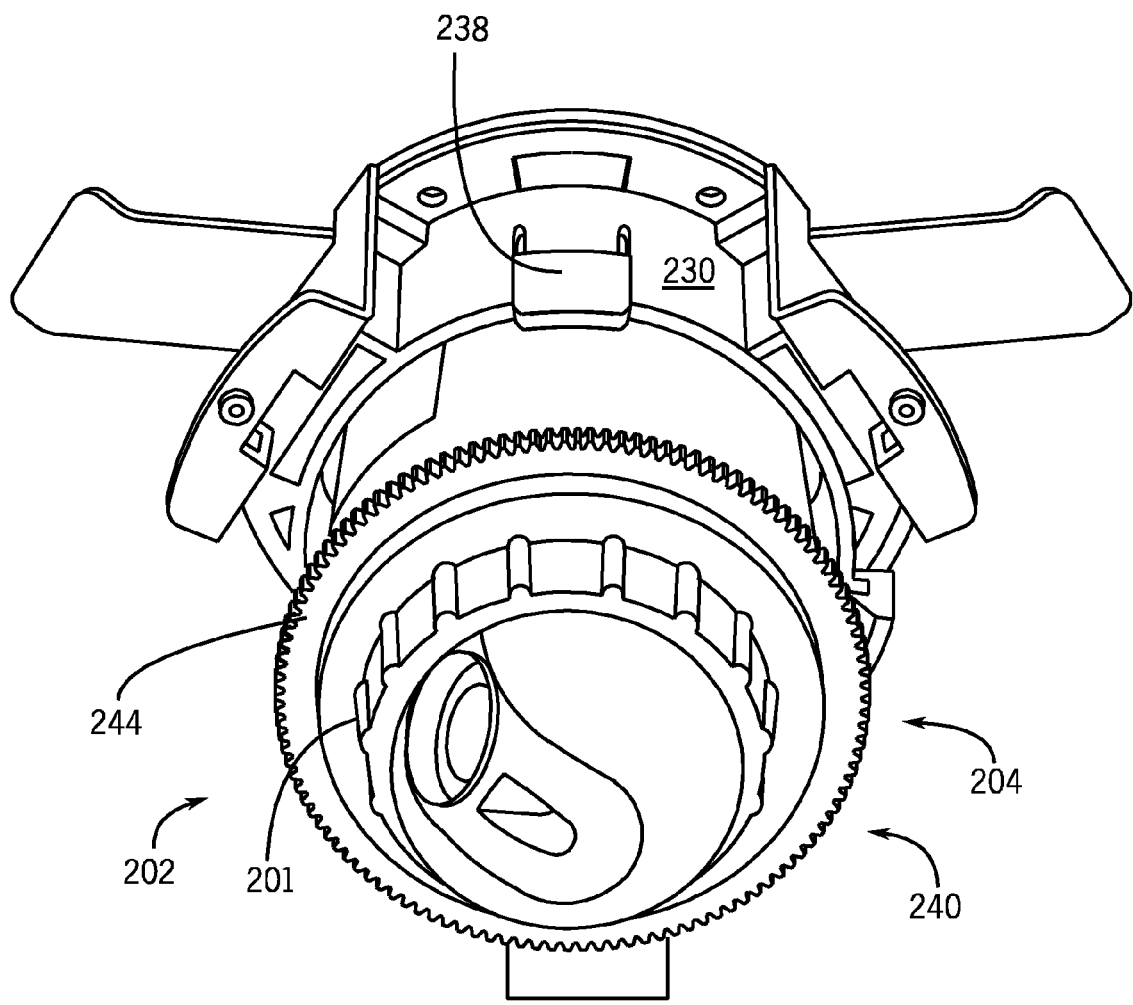
FIG. 4 illustrates various steps for removing a camera mounted to a support according to one example.

FIG. 4 illustrates removal of the camera 201. As shown in 201, the camera 201 and camera housing assembly 204 may be removed by moving the lower retention flanges 238 of the camera retention member 230 out of engagement with the engagement flange 244 of the lower member 240 of the camera housing assembly 204. The camera 201 and camera housing assembly 204 may then be removed as desired.

Accordingly, assembly and methods have been discussed herein for mounting a camera assembly to a support, such as a ceiling. In at least one example, brackets may be spring-loaded to readily move between a retracted state and an extended state. In one such example, the brackets may be rotated between the retracted state and the extended state. When the brackets are in the retracted state, the camera assembly is able to pass through an opening in a support. Once positioned relative to the support, as the brackets rotate toward the extended state, the brackets move into engagement with the support. Continued rotation of the brackets moves the camera into position thereby mounting the camera to the support. Such a configuration may allow for ready mounting of cameras in overhead locations while minimizing the use of tools.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A camera mounting assembly for mounting a camera in a hole in an overhead support, comprising:
   a positioning support defining a central opening with a central axis, and configured to be inserted into the hole in the overhead support, the positioning support including:
      an upper flange extending away from the central axis,
      first struts connected to the upper flange and extending away from the upper flange in the direction of the central axis, and
      lower flanges connected to the first struts, spaced apart from the upper flange, and extending away from the first struts and the central axis, the lower flanges configured to couple to a bottom surface of the overhead support;
   a retention member connected to the upper flange and including second struts and retention flanges; and
   a plurality of brackets, each of the brackets including:
      a first end coupled to the upper flange of the positioning support, and
      a second end spaced apart from the first end and configured to couple to a top surface of the overhead support; and
   wherein the brackets are configured to move between a retracted state for inserting the camera mounting assembly into the hole in the overhead support and an extended state for securing the camera mounting assembly to the overhead support, in the retracted state the second ends of the brackets are at a first distance from the central axis, and in the extended state the second ends of the brackets are at a second distance from the central axis, the second distance being greater than the first distance, and
   wherein the camera mounting assembly is configured to receive a camera housing of the camera through the central opening of the positioning support, and the retention flanges of the retention member are configured to engage an engagement flange on the camera housing to retain the camera housing in the central opening of the positioning support.

2. The camera mounting assembly of claim 1, wherein a plane is defined by the first ends of the brackets and a line perpendicular to the central axis and wherein the second ends of the brackets are on a first side of the plane when the brackets are in the retracted state and are on a second side of the plane when the brackets are in the extended state, the second side of the plane being opposite the first side of the plane.

3. The camera mounting assembly of claim 2, wherein the brackets are configured to rotate between the retracted state and the extended state.

4. The camera mounting assembly of claim 3, further including biasing members coupled to the brackets, the biasing members being configured to exert biasing forces on the brackets to move the brackets toward the extended state.

5. The camera mounting assembly of claim 1, wherein when the brackets are in the retracted state, at least one of the brackets is oriented at an acute angle relative to a reference line passing through the at least one bracket and being parallel to the central axis, and when the at least one bracket is in the in the extended state, the at least one bracket is at an obtuse angle relative to the reference line.

6. A camera assembly for mounting in a hole in an overhead support, comprising:
   a camera mounting assembly including:
      a positioning support defining a central opening with a central axis, and configured to be inserted into the hole in the overhead support, the positioning support having an upper flange extending away from the central axis, first struts connected to the upper flange and extending away from the upper flange in the direction of the central axis, and lower flanges connected to the first struts, spaced apart from the upper flange, and extending away from the first struts and the central axis, the lower flanges configured to couple to a bottom surface of the overhead support,
      a retention member connected to the upper flange and including second struts and retention flanges,
      a plurality of brackets, each of the brackets including a first end coupled to the upper flange of the positioning support, and a second end spaced apart from the first end and configured to couple to a top surface of the overhead support, wherein the brackets are configured to move between a retracted state for inserting the camera mounting assembly into the hole in the overhead support and an extended state for securing the camera mounting assembly to the overhead support, in which in the retracted state the second ends of the brackets are at a first distance from the central axis and in the extended state the second ends of the brackets are at a second distance from the central axis, the second distance being greater than the first distance; and
   a camera coupled to the mounting assembly,
   wherein the camera mounting assembly is configured to receive a camera housing of the camera through the central opening of the positioning support, and the retention flanges of the retention member are configured to engage an engagement flange on the camera housing to retain the camera housing in the central opening of the positioning support.

7. The camera assembly of claim 6, wherein a plane is defined by the brackets and a line perpendicular to the central axis and wherein the second ends of the brackets are on a first side of the plane when the brackets are in the retracted state and are on a second side of the plane when the brackets are in the extended state, the second side of the plane being opposite the first side of the plane.

8. The camera assembly of claim 6, wherein the brackets are configured to rotate between the retracted state and the extended state.

9. The camera assembly of claim 8, further including biasing members coupled to the brackets, the biasing members being configured to exert biasing forces on the brackets to move the brackets toward the extended state.

10. The camera assembly of claim 6, wherein when the brackets are in the retracted state, at least one of the brackets is oriented at an acute angle relative to a reference line passing through the at least one bracket and being parallel to the central axis, and when the at least one bracket is in the in the extended state, the at least one bracket is at an obtuse angle relative to the reference line.

11. The camera assembly of claim 6, further comprising a cover, the cover being configured to magnetically couple to the camera assembly.

* * * * *